Figure 1:
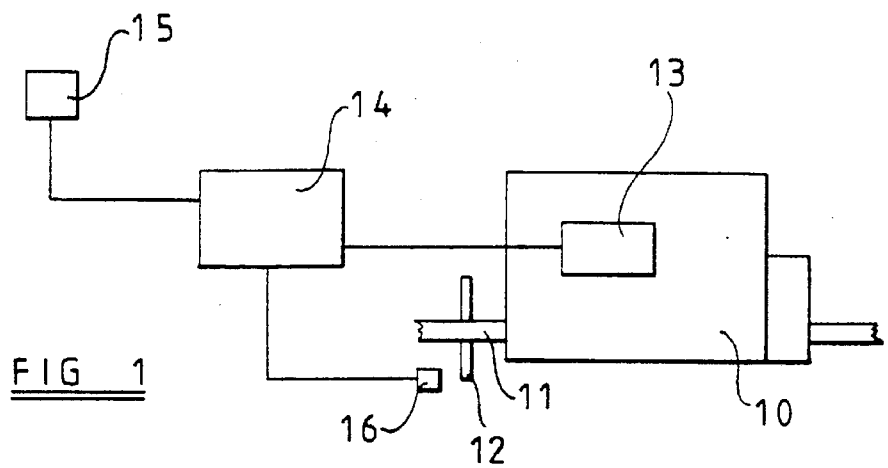

United States Patent [19]
Wrobel et al.

[11] Patent Number: 5,628,291
[45] Date of Patent: May 13, 1997

[54] METHOD FOR ERROR CORRECTION IN MEASUREMENT OF ENGINE SPEED

[75] Inventors: Jeremy S. Wrobel; Robert E. Gravestock, both of Middlesex, England

[73] Assignee: Lucas Industries, Public Limited Company, England

[21] Appl. No.: 586,752

[22] PCT Filed: Aug. 4, 1994

[86] PCT No.: PCT/GB94/01711

§ 371 Date: Jan. 29, 1996

§ 102(e) Date: Jan. 29, 1996

[87] PCT Pub. No.: WO95/04879

PCT Pub. Date: Feb. 16, 1995

[30] Foreign Application Priority Data

Aug. 6, 1993 [GB] United Kingdom ............... 9316367

[51] Int. Cl.$^6$ ............... F02D 41/34; G01P 11/00
[52] U.S. Cl. ............... 123/357; 123/436
[58] Field of Search ............... 123/357, 419, 123/436, 488; 73/118.1

[56] References Cited

U.S. PATENT DOCUMENTS

| 4,553,427 | 11/1985 | Kuraoka et al. | 73/117.3 |
|---|---|---|---|
| 5,117,681 | 6/1992 | Dosdall et al. | 73/116 |
| 5,207,199 | 5/1993 | Sekiguchi | 123/357 |
| 5,339,781 | 8/1994 | Osawa | 123/357 |
| 5,385,129 | 1/1995 | Eyberg | 123/436 |
| 5,495,415 | 2/1996 | Ribbens et al. | 123/436 |

*Primary Examiner*—Thomas N. Moulis
*Attorney, Agent, or Firm*—Andrus, Sceales, Starke & Sawall

[57] ABSTRACT

A fuel system for an engine (10) includes a fuel pump (13), a controller (14) which controls the operation of the fuel pump so that fuel is delivered to the engine at the required time and in the desired quantity, and a transducer (15) for supplying a demand signal to the controller. The system also includes a transducer (16) which provides signals in response to the passage of indicia on a wheel (12) driven by the engine. The system further comprises means for determining the indicia spacing errors and further means responsive to the generally sinusoidal fluctuation of engine speed which corrects the determined spacing. errors.

2 Claims, 2 Drawing Sheets

METHOD FOR ERROR CORRECTION IN MEASUREMENT OF ENGINE SPEED

This invention relates to a fuel system for an internal combustion engine, the system comprising a fuel pump, a controller for controlling the operation of the fuel pump so that fuel is delivered to the engine at the required time and in the desired quantity, means for supplying a demand signal to the controller, a wheel driven by the engine, a plurality of indicia on the wheel, and positioned about the axis of rotation thereof, transducer means responsive to the passage of said indicia as the wheel rotates, and means responsive to the signals generated by said transducer means for measuring the time intervals between the passage of the indicia past said transducer means.

In an example the indicia take the form of teeth which are formed in the periphery of the wheel and the transducer means is a variable reluctance probe. However, the indicia may have other forms such for example as a plurality of marks on the surface of the wheel and the transducer means in this case would comprise an optical sensor. The teeth or other indicia are equiangularly spaced about the axis of rotation of the wheel however, due to manufacturing difficulties the spacings may not be exactly equal and this means that for a given speed of rotation of the wheel, the time intervals between the passage of the teeth past the transducer means will not be equal and therefore the speed signal which is computed each time a tooth passes the transducer means will not be constant even through the rotational speed is constant.

In practice the speed of an engine fluctuates in a generally sinusoidal manner, as each engine cylinder partakes of its power stroke and this represents an additional problem when determining the engine speed.

WO-A-9307497 and U.S. Pat. No. 5,117,681 describe methods of correcting for tooth spacing errors but in each case the assumption is made that it is possible during operational use of the engine to arrange that the engine speed is either constant or there is a constant speed change. In WO-A-9307497 the constant speed change is said to take place when the engine is decelerating. U.S. Pat. No. 5,117,681 also refers to engine deceleration and advocates that this should be carried out with the fuel supply to the engine cut off and with the throttle closed. As an alternative it is stated that the engine speed can be regarded as constant when the engine is being cranked by the starter motor without fuel being supplied to the engine.

The engine in U.S. Pat. No. 5,117,681 is clearly a spark ignition engine having a much lower compression ratio than a diesel engine. It is not clear what sort of engine is envisaged in WO-A-9307497.

Applicant has found that with the much higher compression ratio of a diesel engine which of course does not have an air flow restricting throttle, there is still sufficient engine speed fluctuation on overrun or when the engine is decelerating, to make it necessary to take the speed fluctuation into account.

The object of the invention is to provide such a system in a simple and convenient form.

According to the invention a fuel system of the kind specified includes means for determining indicia spacing errors from the signals provided by the transducer means and further means responsive to the generally sinusoidal fluctuation of engine speed for correcting the determined indicia spacing errors, the corrected determined indicia spacing errors being utilised with the measured time intervals to provide an engine speed signal to the controller.

Figure 2:
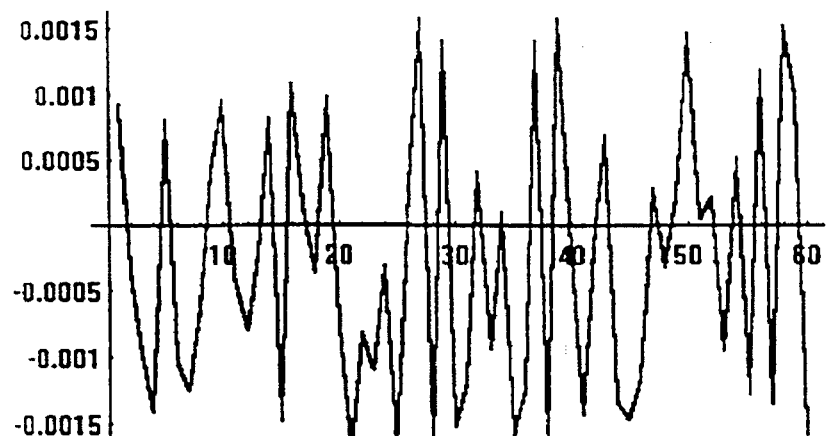
Figure 3:
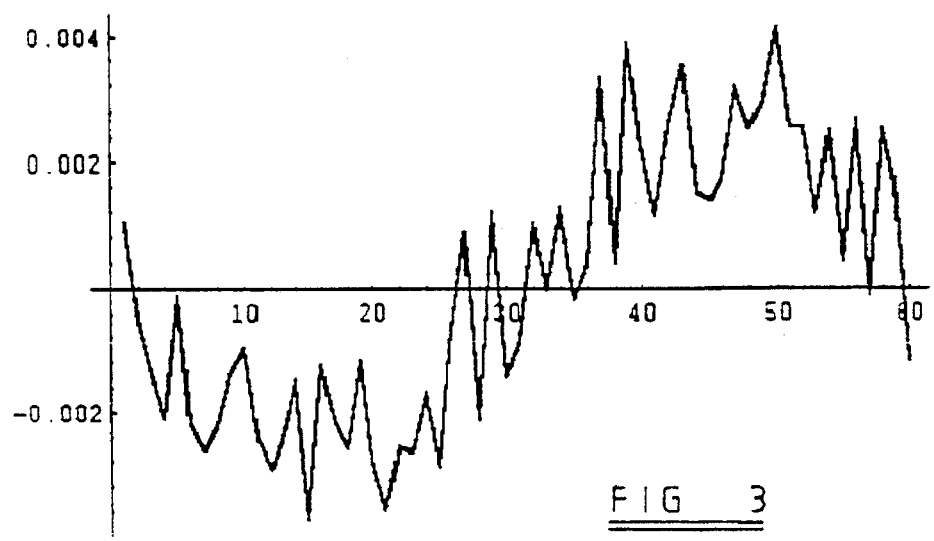

An example of a fuel system in accordance with the invention will now be described with reference to the accompanying drawings and diagrams in which:

FIG. 1 is a diagrammatic layout of the fuel system as applied to a compression ignition engine, FIG. 2 is a graph showing a pseudo random sequence of tooth spacing errors for a 60 tooth wheel, the X axis showing the tooth number and the Y axis the error in degrees, FIG. 3 is a graph showing the estimated tooth spacing errors as determined using a first processing step of the invention but showing in addition the effect of engine speed fluctuation.

Figure 4:
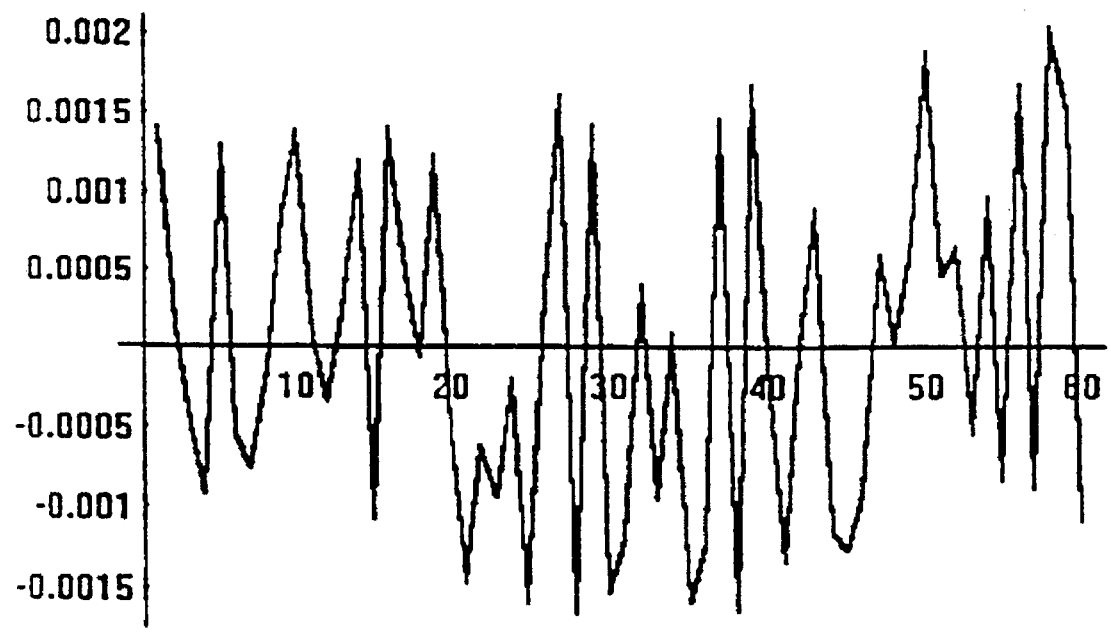

FIG. 4 is a graph similar to that of FIG. 2 showing the estimated tooth spacing errors using the first and second processing steps of the invention.

With reference to FIG. 1 there is indicated at 10 a vehicle compression ignition engine having a crankshaft 11 upon which is mounted a wheel or disc 12 the periphery of which in the example, is provided with 60 substantially equi-angularly spaced teeth.

Fuel is supplied to the engine by means of a fuel pump 13 which may for example, be a rotary distributor pump having an electrically operated control facility or the fuel pump can be replaced by a unit/injector system in which unit/injectors supply fuel to the combustion chambers of the engine respectively, each unit/injector incorporating an electrically controlled spill valve.

For controlling the operation of the pump 13 or the unit/injectors a controller 14 is provided and this supplies signals to determine the quantity of fuel supplied to the engine and the instant of fuel delivery. The controller 14 acts as a governor to control the engine speed and for this purpose it is supplied with a driver demand signal by a transducer 15 associated with the throttle pedal of the vehicle. In addition the controller is supplied with signals by a variable reluctance type transducer 16 which is responsive to the passage of the teeth on the wheel 12 as the engine crankshaft rotates. The controller utilizes the signals provided by the transducer 16 to determine the engine speed and may be supplied with other signals indicative of other engine operating parameters for example air pressure and engine temperature. On the basis of the signals supplied to it, the controller 14 determines the quantity of and the timing of fuel delivery to the engine.

In order that the controller can respond quickly and correctly to changes in the operating parameters of the engine in particular the engine speed, it is necessary to carry out a speed calculation each time a tooth passes the transducer. In the example the wheel has 60 teeth and this means that each tooth is 3° wide and is followed by a gap of the same dimension thereby providing a tooth cycle of 6°.

In practice because of errors in the manufacture of the wheel each tooth cycle may not have the same length and before the engine speed can be calculated it is necessary to know the error in the length of the tooth cycle. FIG. 2 shows a pseudo random sequence of tooth spacing with the error in degrees being some 70 times smaller than that allowed by the manufacturing specification of the wheel. The only information which is available is the time interval between the tooth cycles however, it is possible to show that for a wheel having 60 teeth:

$$T[2].ER[1]-T[1].ER[2]=6(T[1]-T[2])$$

$$T[3].ER[2]-T[2].ER[3]=6(T[2]-T[3]) \text{etc}$$

where

T[1] is the time taken for the first tooth cycle

T[2] is the time taken for the second tooth cycle etc and

ER[1] is the spacing error between teeth 1 and 2

ER[2] is the spacing error between teeth 2 and 3 etc

It is also clear that the total error about the wheel or disc is zero and using matrix techniques it is possible to solve the equation for ER[1], ER[2] etc.

Once the individual tooth spacing errors are known it is possible to calculate the true speed of the engine after the passage of each tooth cycle.

The determination of tooth spacing error described above assumes constant engine speed or more or less constant engine acceleration or deceleration. In practice even when the engine is running at "constant" speed the actual engine speed is fluctuating in a generally sinusoidal manner due to the natural fluctuation of energy which takes place as combustion of fuel takes place in the engine cylinders. This therefore influences the time measurements T[1], T[2] etc., and therefore the calculated tooth spacing errors and the engine speed calculations. FIG. 3 shows the estimated tooth spacing errors calculated as explained above and it also shows the generally sinusoidal variation due to the fluctuating engine speed.

In order to take account of the engine speed variation an auto correlation procedure is carried out on the ER sequence sequentially for all the teeth or marks around the wheel.

The auto correlation procedure involves the shifting of the ER sequence relative to itself by values from 0 to 60. At each shift the juxtaposed values of shifted and unshifted sequences are multiplied together and then summed over all 60 sequence spaces. This results in a new sequence of 60 elements which are then all divided by 60. It will be appreciated that the sinusoidal cnmponent in the FR sequence would be reinforced if the shift procedure outlined above were carried out at shift values of 0 and 60 and it would be cancelled out at a shift value of 30.

The phase of the component is then adjusted so as to have zero angle at the origin and its amplitude adjusted to a value determined by standard auto correlation theory. The resulting sinusoidal component is then added to the original ER sequence thereby eliminating the sinusoidal component by anti-phasing. FIG. 4 shows the estimated spacing errors and it will be seen to follow very closely to the errors as shown in FIG. 2.

The corrected tooth spacing errors enable the true angle between each two adjacent teeth to be calculated and hence it is possible to calculate the engine speed with a greater degree of accuracy.

We claim:

1. A fuel system for a compression ignition internal combustion engine (10) comprising a fuel pump (13), a controller (14) for controlling the operation of the fuel pump so that fuel is delivered to the engine at the required time and in the desired quantity, means (15) for supplying a demand signal to the controller, a wheel (12) driven by the engine, a plurality of indicia on the wheel and positioned about the axis of rotation thereof, transducer means (16) responsive to the passage of said indicia as the wheel rotates, means responsive to the signals generated by said transducer means for measuring the time intervals between the passage of the indicia past said transducer means, characterized by means for determining indicia spacing errors from the signals provided by the transducer means, said means using matrix techniques to solve the equations $$T[2].ER[1]-T[1].ER[2]=6(T[1]-T[2])$$

$$T[3].ER[2]-T[2].ER[3]=6([2]-T[3])$$

$$T[n].ER[n-1]-T[n-1].ER[n]=6(T[n-1]-T[n])$$

where

T[i] is the time taken for an ith indicium cycle and

ER[i] is the spacing error between indicium i and indicium i+1 for T[1] to T[n] and ER[1] to ER[n] and further means responsive to the generally sinusoidal fluctuation of engine speed for correcting the determined indicia spacing errors, the corrected determined indicia spacing errors being utilized with the measured time intervals to provide an engine speed signal to the controller.

2. A fuel system according to claim 1 in which said further means employs an auto correlation procedure.

* * * * *